United States Patent [19]
Warren

[11] Patent Number: 4,593,330
[45] Date of Patent: Jun. 3, 1986

[54] TAPE THREADING ARRANGEMENT FOR 360 DEGREE WRAP TAPE RECORDER

[75] Inventor: Henry R. Warren, Belle Mead, N.J.

[73] Assignee: RCA Corporation, Princeton, N.J.

[21] Appl. No.: 488,814

[22] Filed: Apr. 26, 1983

[51] Int. Cl.$^4$ .................. G11B 15/00; G11B 15/66
[52] U.S. Cl. ........................................ 360/85; 360/95
[58] Field of Search ............... 360/85, 95, 84, 137; 242/55.19 A

[56]  References Cited
U.S. PATENT DOCUMENTS

| | | | |
|---|---|---|---|
| 4,012,793 | 3/1977 | Blanding | 360/85 X |
| 4,015,292 | 3/1977 | Kirn | 360/130 |
| 4,191,979 | 3/1980 | Polshler | 360/85 |
| 4,322,761 | 3/1982 | Beitler et al. | 360/85 |
| 4,408,236 | 10/1983 | Murata et al. | 360/85 X |
| 4,491,886 | 1/1985 | Saito et al. | 360/85 |

FOREIGN PATENT DOCUMENTS 1267101 3/1972 United Kingdom .

OTHER PUBLICATIONS

"The Theory of Color VCR" in the magazine *Music and Acoustics*, No. 23, May 1975, pp. 23-28.
IBM/TDB vol. 9, No. 8, Jan. 1967, p. 968, "Automatic Tape Proceeding" by Johnson et al.

*Primary Examiner*—John H. Wolff
*Attorney, Agent, or Firm*—Eugene M. Whitacre; Paul J. Rasmussen; Joseph J. Laks

[57] ABSTRACT

A tape threading arrangement for a helical scan VTR with a 360 degree wrap angle has two pairs of guides. The first pair wraps the tape around a drum for 360 degrees. The second pair keeps the tape from contacting the tape on the drum and is actuated by a pair of variable length springs coupled between said guide pairs. This allows a compact structure.

7 Claims, 2 Drawing Figures

TAPE THREADING ARRANGEMENT FOR 360 DEGREE WRAP TAPE RECORDER

BACKGROUND OF THE INVENTION

The present invention relates to a tape threading arrangement for a VTR (video tape recorder), and more particularly to one that threads tape from a cassette around a drum with substantially a 360 degree wrap angle.

In helical scan video recording, a magnetic tape is drawn from a supply reel, wrapped around a drum having a magnetic recording head disposed therein, and then provided to a supply reel. A 360 degree wrap angle allows the drum diameter to be one-half the size of a 180 degree wrap angle configuration for compactness. If the one-half diameter 360 degree drum is rotated at twice the angular speed of the 180 degree drum the same head-to-tape speed is achieved as well as a one field per revolution, non-segmented picture. To achieve further compactness, and also convenience of loading and removal, it is desirable to have the supply and take-up reels coaxially mounted one above the other in a cassette. However, it is difficult to provide automatic threading of tape from a cassette with a 360 degree wrap angle around a drum.

One solution is shown in U. S. Pat. No. 4,191,979. As shown therein, a pair of kidney-shaped "grippers" are used to achieve the threading. However, the grippers are relatively long, and therefore when in their initial position, which is longitudinally disposed between the reels and the drum, a relatively large space must be provided for them. This is done by having a relatively large space between the reels and the drum. For certain applications, such as a VTR used with an ENG (electronic news gathering) camera, this space may be too large.

It is therefore desirable to provide a compact threading arrangement for a 360 degree wrap angle of tape from a cassette.

SUMMARY OF THE INVENTION

Method and apparatus for threading a tape, comprising starting wrapping said tape about a drum using a first pair of guides, thereafter guiding said tape to avoid contact with the tape on said drum using a second pair of guides actuated by and at a variable distance from said first pair, and then completing said wrapping with said first pair so that said tape has a wrap angle of about 360 degrees.

DETAILED DESCRIPTION

Figure 1:
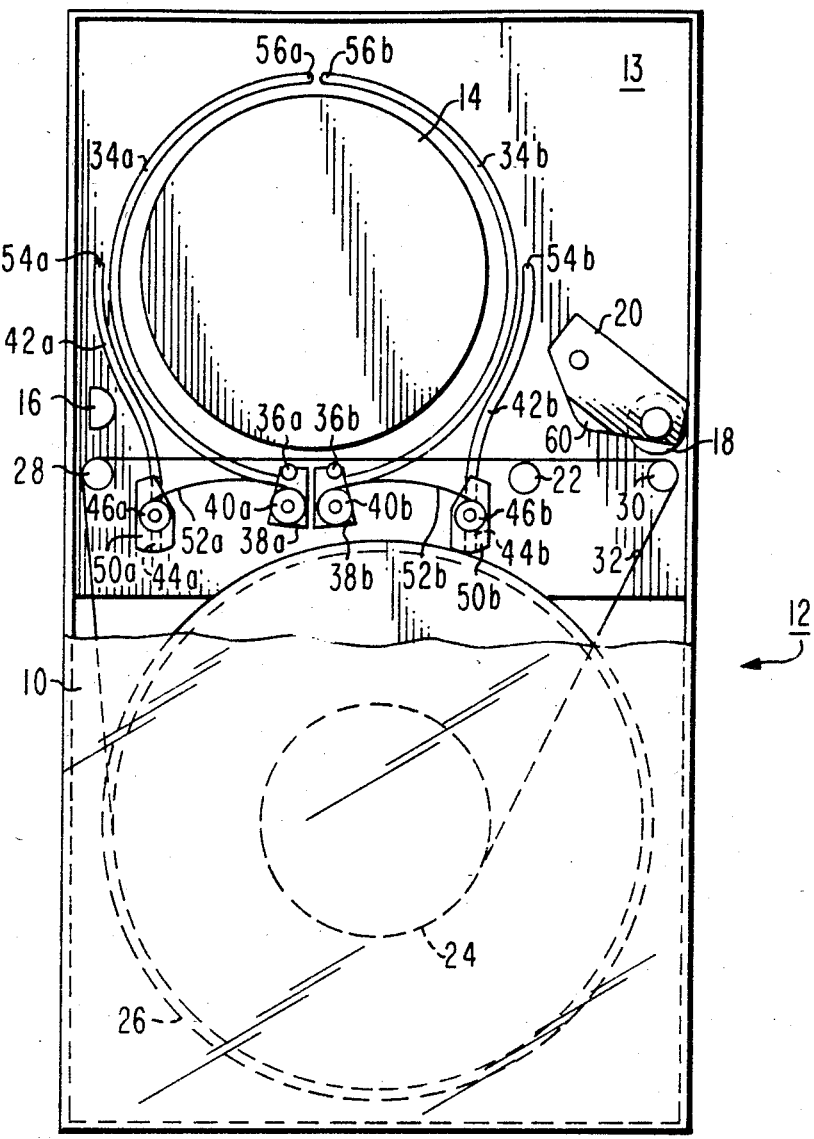
FIG. 1 is a top view of the invention with the tape in the unthreaded position.

FIG. 1 shows a cassette 10 engaging the top of a deck 13 of a VTR 12. As known in the art, VTR 12 comprises a driven split drum 14 disposed above deck 13, said drum 14 having disposed between the sections thereof a magnetic recording head (not shown). An erase head 16 is disposed on one side of drum 14, while on the other side thereof is a pinch roller 18 mounted on a pivotally mounted arm 20, and a driven capstan 22. Conventionally, an audio recording head 60 is mounted on arm 20. Also as known in the art, cassette 10 comprises rotatably coaxially mounted takeup reel 24 and supply reel 26, takeup reel 24 being above supply reel 26. Guide posts 28 and 30 are located at the open end of the cassette. When in the unthreaded position as shown in FIG. 1, tape 32 is coiled around reels 24 and 26 and extends between posts 28 and 30.

In accordance with the invention, a first pair of arcuate slots 34a and 34b are disposed in deck 13 of VTR 12, each such slot extending for substantially 180 degrees around drum 14. Disposed above slots 34a and 34b respectively, are blocks 38a and 38b, which blocks 38 each have a tab (not shown) respectively extending through slots 34. The tabs are respectively coupled to a pair of coaxially mounted counter-rotating ring gears (not shown) by means of a pair of lugs (not shown), all as known in the art. Above blocks 38a and 38b and spaced therefrom are pins 36a and 36b respectively and rotatably mounted rollers 40a and 40b respectively. Since pin 36b and roller 40b must engage that portion of tape 32 that goes onto take up reel 24, which is above supply reel 26, they are spaced a greater distance from block 38b than are pin 36a and roller 40a spaced from block 38a.

A second pair of arcuate slots 42a and 42b are also disposed within deck 13, each of the slots 42 extending for about 90 degrees about drum 14. Blocks 50a and 50b lie above slots 42a and 42b respectively. Tabs 44a and 44b extend from blocks 50a and 50b respectively and are respectively disposed in slots 42a and 42b, while above deck 13 are rollers 46a and 46b respectively mounted on blocks 50a and 50b. Roller 46b is mounted higher on block 50b than roller 46a is mounted on block 50a. Above deck 13 spring 52a extends from between roller 40a and block 38a to between block 50a and roller 46a, while spring 52b extends from between roller 40b and block 38b to between block 50b and roller 46b. It is noted that springs 52 are in the "inside" (towards drum 14) when the apparatus of the invention is in the unthreaded position shown in FIG. 1. Springs 52 are of the self-winding "Negator" type.

Figure 2:
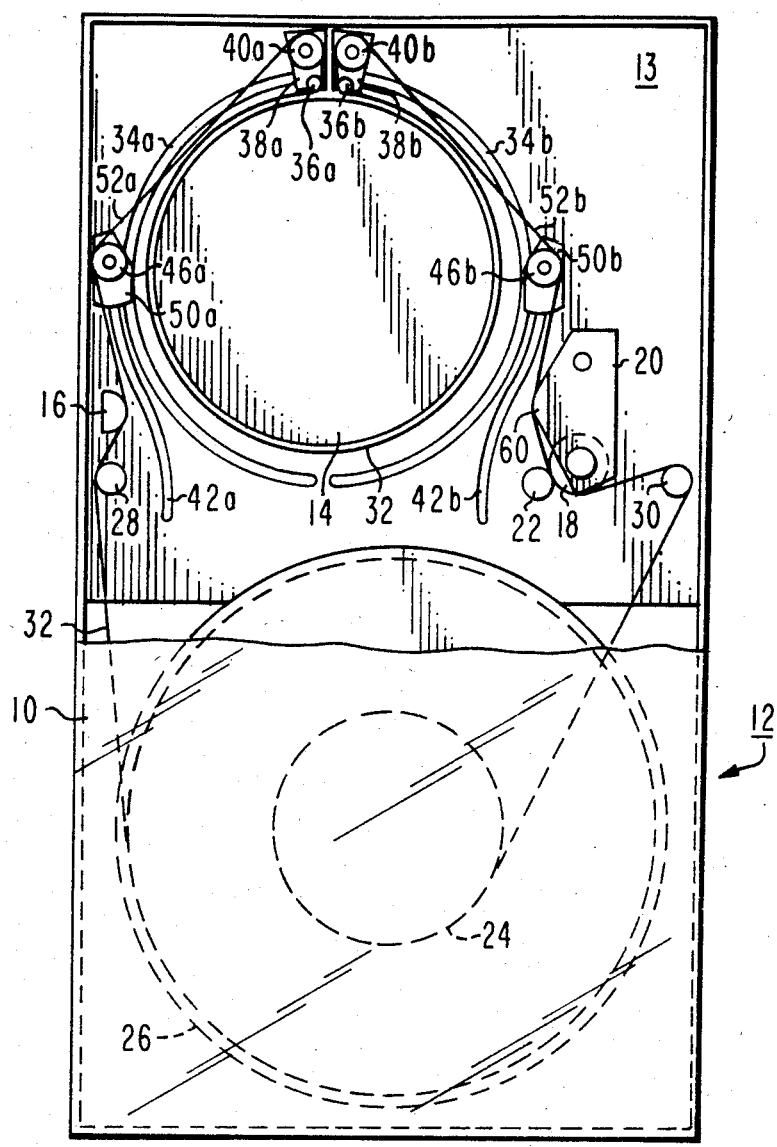
FIG. 2 is a top view of the invention with the tape in the threaded position.

In operation, the threading operation is initiated, either manually or automatically upon insertion of cassette 10 into VTR 12, and said counter-rotating ring gears (not shown) are driven by a motor (not shown) which causes blocks 38 to move in slots 34 respectively and thus rotate in opposite directions about drum 14. During the initial rotation time when blocks 38 move towards blocks 50, springs 52 wind up on cylindrical portions of blocks 38 and 50 below rollers 40 and 46 respectively. As blocks 38 continue their rotation they move past blocks 50 and pins 36 and rollers 40 contact tape 32, thereby starting to wrap tape 32 around drum 14. As the motion of blocks 38 continues, the wound up springs 52 cause blocks 50 to move in slots 42 and thus follow blocks 38. This operation continues until blocks 50a and 50b are adjacent ends 54a and 54b of slots 42a and 42b respectively. As blocks 38 continue moving, springs 52 start unwinding. This continues until blocks 38 reach the ends 56a and 56b of slots 34a and 34b respectively, as shown in FIG. 2. It is noted that since springs 52 are now in the "outside" position (away from drum 14), they avoid contact with drum 14. A conventional limit switch (not shown) senses that blocks 38 are ajacent ends 56 and switches off the motor and ring gears driving blocks 38. Thus tape 32 has been disposed for almost 360 degrees about drum 14 with rollers 46 guiding tape 14 at diametrically opposite points away from contact with that portion of tape 14 that is on drum 14. In a conventional fashion, arm 20 can now be rotated so pinch roller 18 causes tape 32 to contact capstan 22 so that tape 32 can now be driven for recording or playback. Also audio head 60 now contacts tape 32.

It will be appreciated that many variations in the disclosed embodiment are possible. For example, rollers 40 and 46 can each comprises a pair of side-by-side mounted guides with one of the pair being perpendicular to deck 13 and the other being at a slight angle with respect to deck 13. The angled guides accommodate the required change in the tape height as the tape is drawn from supply reel 26 and is provided to take up reel 24, as known in the art.

What is claimed is:

1. Apparatus for threading, in a compact arrrangement, a tape around a drum, comprising a deck having the drum mounted thereon and a first and a second pair of slots formed therein, each of said first pair of slots angularly extending about said drum in a first arcuate path that generally follows the circumference of said drum to provide, as a pair, a wrap angle of nearly 360 degrees, each of said second pair of slots angularly extending about said drum to a smaller angular extent than each of said first pair of slots, in a second arcuate path that generally follows said first arcuate path, a first pair of movable guide means respectively disposed in said first pair of slots for wrapping said tape about the drum along said wrap angle, and mean including a second pair of movable guide means respectively disposed in said second pair of slots and actuated by and a variable distance from said first pair of guide means for positioning said tape during threading operation to avoid contact with the portion of the tape wrapped on said drum, said first pair of slots being interposed between said drum and said second pair of slots to maintain a compact threading path for said tape.

2. Apparatus as claimed in claim 1, wherein each of said first pair comprises a roller and a pin.

3. Apparatus as claimed in claim 2, wherein each of said second pair comprises a roller 4. Apparatus as claimed in claim 1, wherein each of said second pair of slots has an end diametrically opposite from each other.

5. Apparatus as claimed in claim 1, further comprising a pair of springs located above the surface of said deck, each spring linking a respective one of said first pair of movable guide means to a respective one of said second pair of movable guide means to enable said first pair of guide means to actuate said second pair of guide means.

6. Apparatus as claimed in claim 1 wherein the end position of each of said second pair of slots is located at a closer radial distance to said drum than the corresponding radial distance of the beginning position of each of said second pair of slots.

7. Apparatus for threading, in a compact arrangement, a tape around a drum, said apparatus comprising:
a deck having the drum mounted thereon, said deck having a first pair of slots, each of said slots extending for about 180 degrees around said drum in a first arcuate path that generally follows the circumference of said drum, and a second pair of slots, each slot of said second pair extending about said first pair remote from said drum for less than or about 90 degrees in a second arcuate path that generally follows the first arcuate path.
a first pair of movable guide means respectively disposed in said first pair of slots for wrapping the tape about the drum with a wrap angle of about 360 degrees;
a second pair of movable guide means respectively disposed in said second pair of slots for guiding the tape to avoid contact with that portion of the tape on the drum; and
a pair of springs located above the surface of said deck, each spring coupling a respective one of said first pair of guiding means to a respective one of said second pair of guiding means to provide cooperative movement therebetween in their respective slots.

* * * * *